United States Patent [19]

Bradley

[11] 4,175,515
[45] Nov. 27, 1979

[54] SANITARY UNIT FOR CONFINED ENVIRONMENTAL CONTROLLED FEEDING OF HOGS

[76] Inventor: Kenneth M. Bradley, Rte. 5, Meadow Brook, Dowagiac, Mich. 49047

[21] Appl. No.: 857,295

[22] Filed: Dec. 5, 1977

[51] Int. Cl.² .......................... A01K 1/00; A01K 1/01
[52] U.S. Cl. .......................................... 119/16; 119/28
[58] Field of Search .............................. 119/16, 20, 28

[56] References Cited

U.S. PATENT DOCUMENTS

| | | | |
|---|---|---|---|
| 487,548 | 12/1892 | Wilbor, Jr. | 119/28 |
| 2,233,766 | 3/1941 | Bogert | 119/16 |
| 3,223,070 | 12/1965 | Gribble et al. | 119/16 |
| 3,584,603 | 6/1971 | Rutherford | 119/16 |
| 3,859,962 | 1/1975 | Kissinger, Jr. | 119/28 |
| 3,918,404 | 11/1975 | Bunger | 119/28 |

Primary Examiner—Hugh R. Chamblee
Attorney, Agent, or Firm—Oltsch, Knoblock & Hall

[57] ABSTRACT

A sanitary unit for confined environmental controlled feeding of hogs wherein a building is equipped with means to provide a controlled atmosphere and temperature environment and contains a plurality of pens each having feeding and watering stations. The floor of the building is provided with a trough extending through each pen spaced from the feeding station and covered by a grill. Pressurized water jets discharged into said trough at spaced points along said trough below said grill in a direction angularly of the trough and generally toward a discharge outlet to which the bottom of said trough slopes.

8 Claims, 6 Drawing Figures

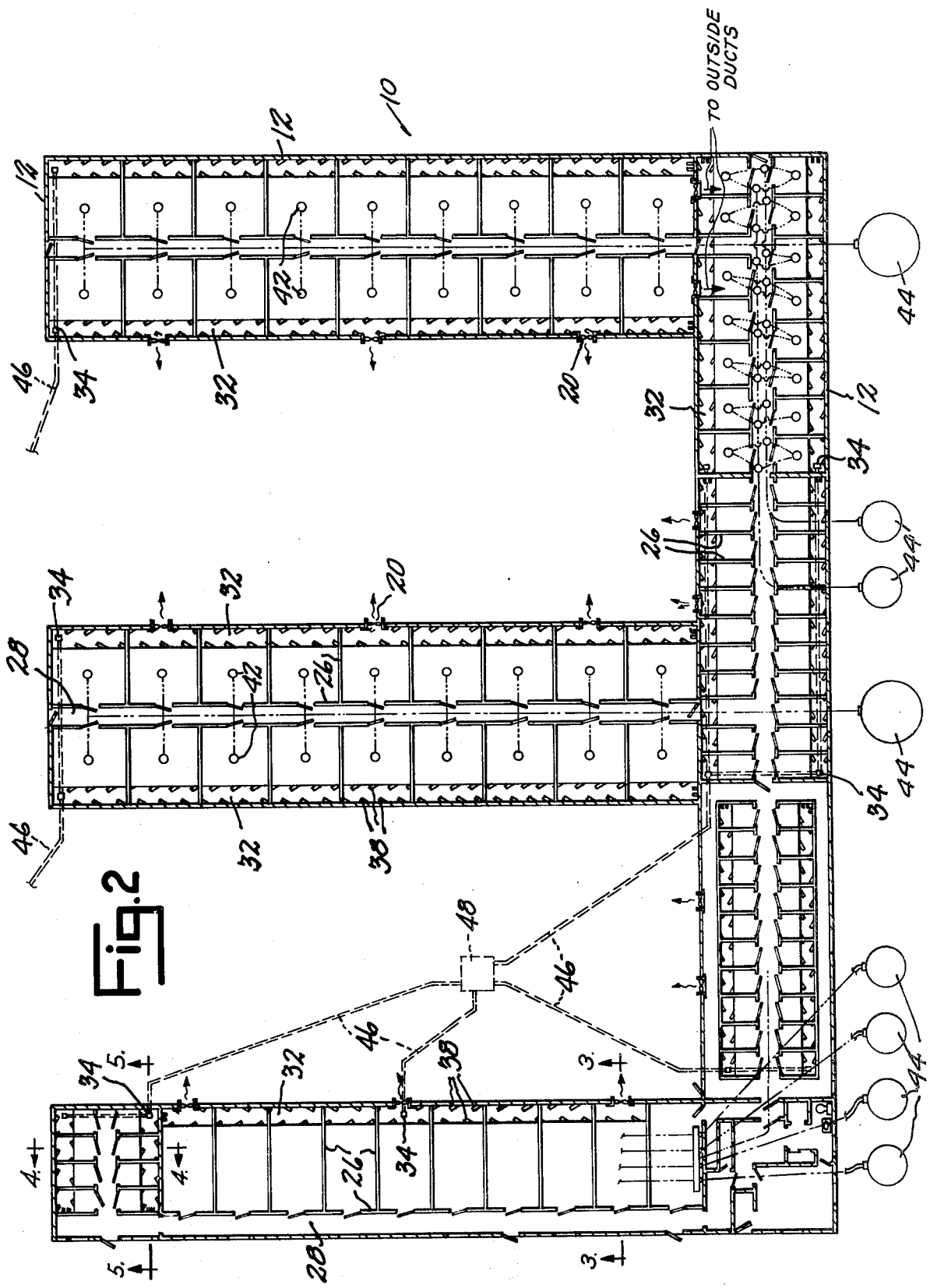

SANITARY UNIT FOR CONFINED ENVIRONMENTAL CONTROLLED FEEDING OF HOGS

SUMMARY OF THE INVENTION

This invention relates to a sanitary unit for the confined environmental controlled feeding of hogs.

In the rearing of hogs it has been found that their growth to condition for slaughter and marketing can be expedited if they are confined and are fed a regulated diet. Hogs are sensitive to environmental conditions and to illness in unsanitary quarters. Heretofore, hog rearing units in which hogs are confined have been difficult to keep clean, have not provided an adequately controlled environment, and have required both attention and considerable time and effort by attendants.

The primary object of this invention is to provide a sanitary unit in which hogs can be confined under controlled environmental conditions and fed for rapid and favorable growth.

A further object is to provide a unit of this character which can be maintained with minimum physical labor and in which sanitary conditions are maintained favorable to the growth of hogs.

Other objects will be apparent from the following specifications.

BRIEF DESCRIPTION OF THE DRAWINGS

FIG. 2 is a schematic plan of a building usable in the unit.

DESCRIPTION OF THE PREFERRED EMBODIMENT

This unit is constructed to accommodate and take advantage of known habits of hogs, such as the characteristic trait of hogs to defecate at locations spaced from the place at which they feed. The unit provides enclosures for groups of hogs, each enclosure being provided with suitable feeding and watering facilities. The environment in the unit and enclosures is controlled as to temperature, and air circulation is provided to avoid accumulation of lethal gases from fecal material and thereby protect both the swine and attendants from such gases occurring naturally in a swine-confining enclosure. Each enclosure has a floor sloping gradually to a trough spaced from the feeding faciliteis and covered by a shiftable grill, which trough slopes to a discharge outlet communicating with an externally located holding pit from which effluent from the trough periodically may be pumped to a remote aerating pond or lagoon in which exposure to air produces breakdown of the organic material of the effluent. Each trough within the unit is provided with a series of longitudinally spaced jets connected with a pressurized water supply system which accommodate periodic flushing of the troughs and organic material discharged therein by the swine.

Figure 1:
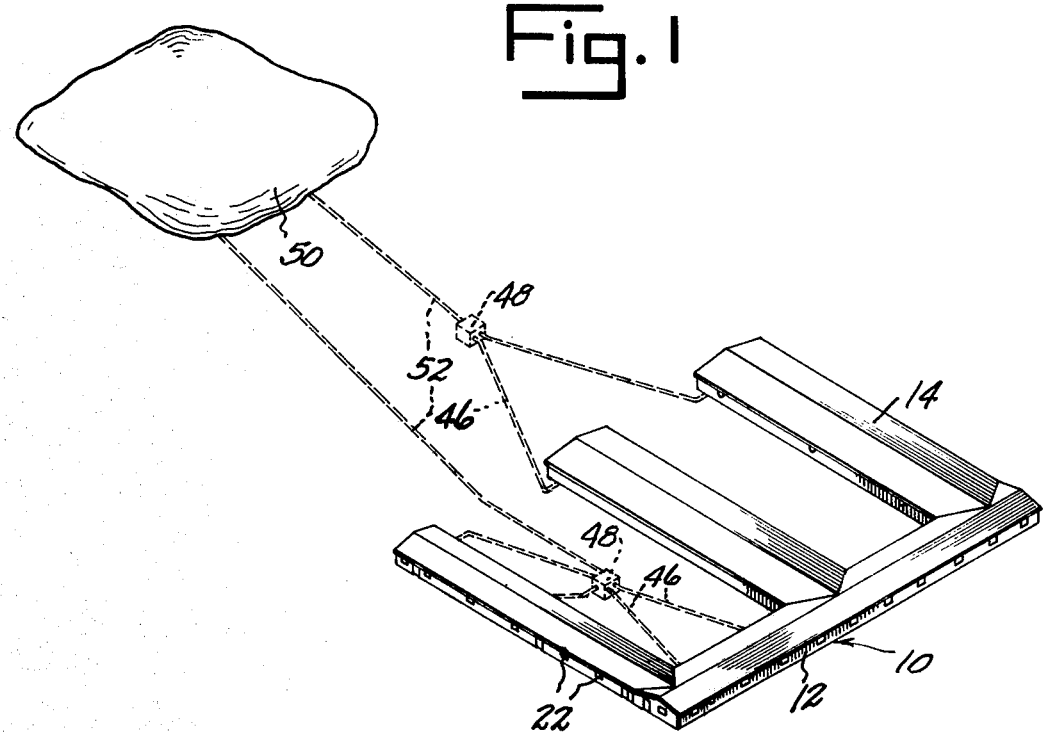
FIG. 1 is a perspective view of the unit or system.
Figure 3:
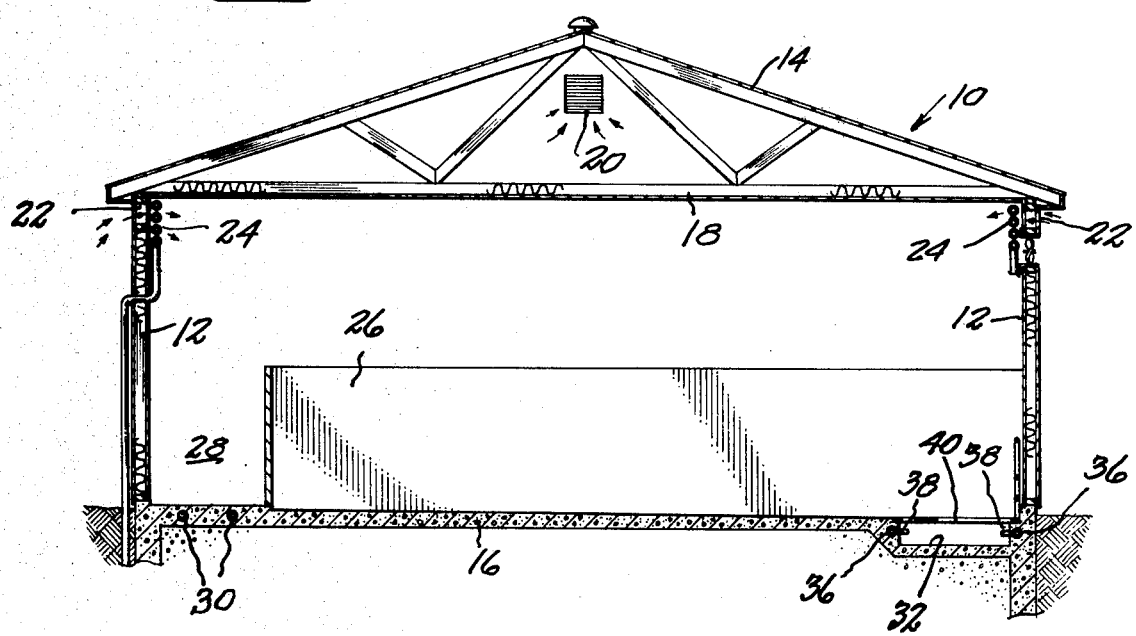
FIG. 3 is a vertical sectional view of a portion of the building as seen on line 3—3 of FIG. 2.

Referring to the drawings which illustrate one embodiment of the invention, the numeral 10 designates a building having walls 12, roof 14 and floor 16. The building may be of any selected shape and size and may be provided with a ceiling 18. Walls 12 and ceiling 18 are preferably insulated. If desired, the ceiling 18 may be provided with one or more openings (not shown) and openings 20 may be provided at spaced points in the walls above the ceiling, each preferably provided with a blower (not shown) to facilitate circulation of air into and through the building from spaced openings 22 in the upper parts of walls 12. Each wall opening 22 preferably has juxtaposed thereto a water coil 24 through which air entering the opening 22 may pass. Coils 24 are preferably connected in a water circulating system including an underground water container and a pump (not shown) for circulating water to and through the coils 24 for return to the underground container. A plurality of partitions 26 may be provided in the building to define stalls or enclosures within which a group of swine may be confined, and adjacent to which extends an aisle 28. The aisle may extend along one wall of the building as illustrated in FIG. 3, or may be located centrally in the building as illustrated in the right hand portion of FIG. 2. Attendants may reach each stall or enclosure from an aisle.

The floor 16 is formed of concrete and may have embedded therein, as at the aisles 28, conduits 30 connected in a water circulating system having a boiler or other means (not shown) by which water circulated in the conduits may be heated. The floor in each stall is preferably slightly sloped, for example at a slope of ⅛ inch per foot away from the aisle and toward a trough 32 remote from the aisle and preferably extending along or adjacent to an outer wall. Each trough is provided with one or more outlets 34 in the bottom thereof. Toward each outlet the bottom of the adjacent part of the trough slopes lengthwise, as at the rate of ⅜ inch per foot.

Figure 4:
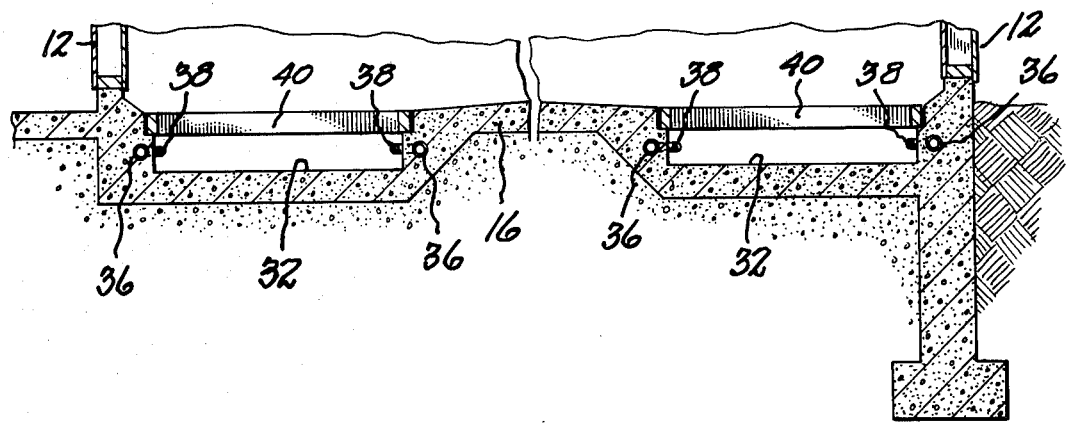
FIG. 4 is a fragmentary vertical sectional view of the building as seen on line 4—4 of FIG. 2.
Figure 5:
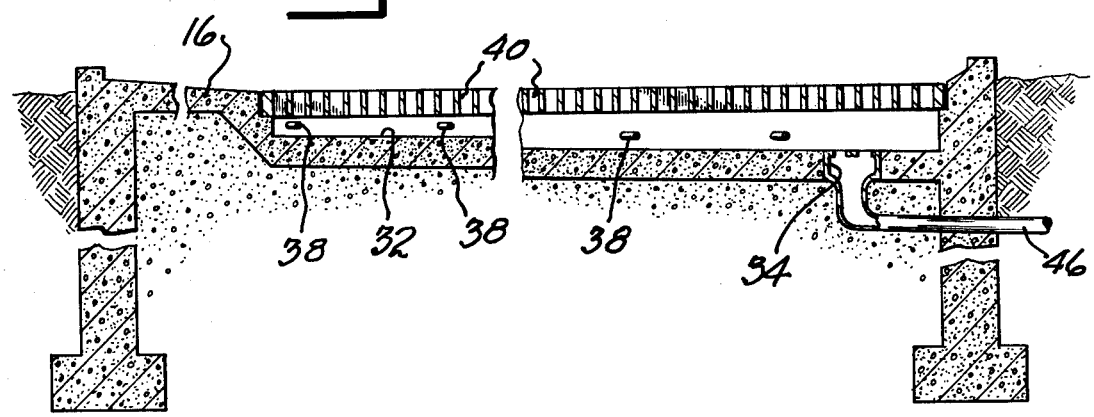
FIG. 5 is a vertical sectional view of the building as seen on line 5—5 of FIG. 2.
Figure 6:
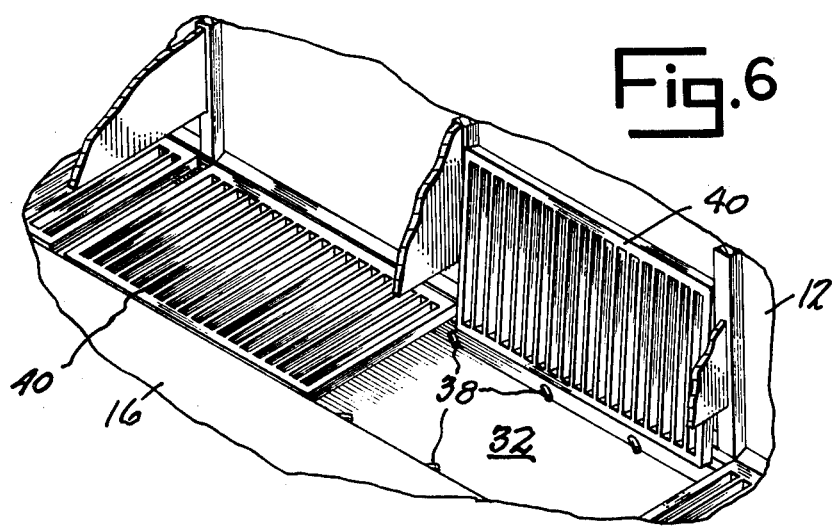
FIG. 6 is a fragmentary perspective detail view illustrating a floor trough and sectional trough spanning member used in the unit.

Each trough 32 has a depth sufficient to ensure retention of material collected therein, for example, a depth of four inches at the shallowest portion thereof and progressively increasing along its length toward each outlet 34. The floor 16 has embedded therein, as at and adjacent each side of each trough, a water line 36 as illustrated in FIGS. 3 and 4 which is connected with a pressurized water supply system. At spaced intervals along each water line 36 are connected a plurality of discharge nozzles 38 which project into the trough to discharge therein at an angle, that is diagonally into the trough and in the general direction of the outlet 34 toward with the trough slopes at the point of discharge. The nozzles 38 on opposite sides of the trough are preferably staggered and positioned as illustrated in FIG. 2. The water lines 36 are connected with a water supply system operating at substantial pressure, as in the range from 50 psi to 75 psi, so that jets discharged effectively flush the trough and ensure that the fecal contents of the trough are jetted or drained to the adjacent discharge point or outlet 34. The troughs 32 are normally covered by grill or grid members 40 spanning the trough and formed in sections which accommodate the manual elevation or pivoting thereof to a cleaning position as illustrated in FIG. 6. Each grid member is strong enough to sustain the weight of swine standing thereon and accommodates passage therethrough of defecated material.

The unit is also provided with suitable means for providing food and water for ingestion by the swine in each stall or enclosure. Thus, there has been illustrated schematically in FIG. 2, means or stations 42 at which food and water is available to the swine in each enclosure. Food and water supply means 44 may be located exteriorly of the building and connected to the feeding and watering stations 42 by conduits or lines provided with suitable means for delivering food and water to the discharge stations 42 and for controlling the grade or level of supply at each discharge station 42.

Each of the trough outlets 34 is connected by a line 46 to an underground holding pit 48 which preferably is located exteriorly of the building at a position to conveniently collect, as by gravity flow, the effluent from the trough discharged at the outlets 34. Pit 48 may be concrete lined, of a depth of six feet or more, and of a capacity to receive and collect the normal amount of fecal effluent discharged upon each operation of the trough flushing system at selected time intervals. At a distance from the building 10 preferably sufficient to dissipate odors is located a lagoon or pond 50 connected to the pit or pits 48 by a line 52 through which fecal effluent collected in the pit or pits 48 may be pumped periodically. The lagoon or pond 50 is of a selected size correlated to the size of the building and the number of animals to be fed. The lagoon is lined with clay of a depth or thickness in the order of 18 inches to retain effluent collected therein. The lagoon is open or exposed to receive and collect rain water.

The building may also be provided with high pressure water jetting cleaning means (not shown) such as a nozzle on a long hose supplied from a high pressure water supply. The nozzle can be directed against the grids 40, both when horizontal in use position and when tilted to cleaning position as illustrated in FIG. 6. Also, this means may be used for flushing the floor of each pen or enclosure from time to time.

The unit provides all means necessary for rearing, feeding and maintaining swine under optimum conditions for growth with minimum manual attention required and with facilities to ensure a sanitary condition. The facility may be of any size required to handle a selected large number of swine and may be provided with various sections or areas, such as a boar area, a gestation area, a farrowing area, a sow and litter nursing area, a growing area and a finishing area. Each area has pens or enclosures for one or more hogs, means in each pen or enclosure at which hogs may feed and drink, and each pen or enclosure having a grid-covered fecal collecting trough in a portion of the floor thereof spaced from the feeding means. The troughs are narrow in width and area compared to the area of each holding pen or enclosure.

The natural instincts and habits of swine are such that they defecate at a point spaced from the location at which they feed, so that feeding troughs are preferably positioned near the aisles and spaced from the drainage troughs to which the swine will naturally move to defecate. Defecated material passes through the grids 40 for collection in a trough 32.

The troughs 32 are jetted periodically upon operation of a control (not shown) which may be either manual or automatically timed and serves to discharge water at sufficient pressure and in sufficient quantity to ensure that fecal material accumulated in the trough in the preceding time interval will be flushed to the adjacent discharge 34. The jetting nozzles 38 are preferably located adjacent to and slightly below the bottom of the grid and preferably are directed angularly inwardly and downwardly. The nozzles 38 are so spaced along each side of a trough, such as at intervals in the order of four feet, that an effective cleansing and flushing of the troughs is accomplished by water discharged thereby. The effluent from each flushing operation is drained to a holding pit 48 which may periodically be emptied by pumping its contents into the pond 50. Natural aeration of the contents of the pond or lagoon breaks down the organic matter therein without extensive generation of odor and in time converts the contents to a condition suitable for use as a liquid fertilizer, as by pumping lagoon contents therefrom into the tank of a vehicle that distributes the fertilizer.

The sanitary facilities are completed by the high pressure hose which may be used to flush the floor of each pen or enclosure periodically and to clean the grids by directing water therethrough and by directing water at the bottom side of a grid section tilted to a cleaning position as illustrated in FIG. 6.

The air circulating means, such as blowers at building openings 20, provide for circulation of air through the building at a rate which can be regulated and which will ensure against the accumulation of fecal gases, such as methane, from which it is desired to protect the swine and also attendants. Air must be circulated continuously. The air inlets 22 and the outlets 20 are preferably located at such levels that the swine are protected from drafts of air. The air circulating means may also be utilized to control the temperature within the building during hot weather. Thus, the water coils 24 associated with an underground water circulating system and positioned adjacent to the air inlet wall openings 22 may be employed during hot weather to cool air flowing therepast. Cooling of the air, coupled with insulation of the building, protects the swine from high ambient temperature conditions.

The environmental conditions of the unit are also controlled by the provision of the heating coils 30 which may be used in cold weather to circulate heated water and to heat the building to an extent sufficient, in conjunction with the heat generated by the animals, to maintain a desired temperature condition within the building during cold weather.

While the preferred embodiment of the invention has been illustrated and described it will be understood that changes in the unit may be made within the scope of the appended claims without departing from the spirit of the invention.

What I claim is:

1. In a sanitary unit for confined environmental controlled feeding of hogs,
    a building having walls, a roof and a floor,
    means in said building forming a plurality of pens for confining hogs,
    means in each pen providing feeding and watering stations for hogs,
    means controlling the environment and temperature in said building,
    the floor of said building including an elongated trough extending through each pen spaced from said feeding and watering stations, said trough having a bottom inclined longitudianlly to a discharge outlet, a multi-section removable grill covering said trough, and means for periodically directing and discharging jets of water at a pressure in the order of 50 psi or more diagonally into said trough below said grill at points spaced apart in the order of 4 ft. along the length of and at each side of the trough.

2. A unit as defined in claim 1, and an underground holding pit spaced from said building and connected to said trough discharge outlet for drainage of said troughs thereto, and a lagoon remote from said building connected to receive the content of said pit and open to atmosphere to collect rainfall and aerate effluent from said pit, said lagoon being spaced from said building a distance sufficient to dissipate odors from the lagoon.

3. A unit as defined in claim 2, and means for pumping contents of said pit into said lagoon.

4. A unit as defined in claim 2, wherein said lagoon is lined to retain its contents against seepage into the earth.

5. A unit as defined in claim 1, wherein said last named means includes a pressurized water line extending along said trough, and a plurality of nozzles projecting from said line and into said trough at longitudinally spaced points.

6. A unit as defined in claim 1, wherein said last named means includes pressurized water lines extending along the opposite sides of said trough below the level of the floor, and a plurality of nozzles projecting from said lines into said trough at longitudinally spaced points to discharge angularly laterally in said trough in the direction of said trough outlet.

7. A unit as defined in claim 6, wherein the nozzles at opposite sides of said trough are arranged in longitudinally staggered relation.

8. A unit as defined in claim 1, wherein the floor in each pen slopes toward said drain.

* * * * *